(12) United States Patent
Sassanelli et al.

(10) Patent No.: US 11,149,587 B2
(45) Date of Patent: Oct. 19, 2021

(54) RADIAL—AXIAL TURBOEXPANDER

(71) Applicant: Nuovo Pignone Tecnologie—S.r.l., Florence (IT)

(72) Inventors: Giuseppe Sassanelli, Florence (IT); Paola Di Festa, Florence (IT); Giuseppe Iurisci, Barcelona (ES); Francesco Cangioli, Florence (IT); Roberto Marchi, Florence (IT); Davide Biliotti, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 0 days.

(21) Appl. No.: 16/353,307

(22) Filed: Mar. 14, 2019

(65) Prior Publication Data
US 2019/0284935 A1 Sep. 19, 2019

(30) Foreign Application Priority Data
Mar. 14, 2018 (IT) .................. 102018000003550

(51) Int. Cl.

| | |
|---|---|
| *F01D 25/16* | (2006.01) |
| *F01D 1/04* | (2006.01) |
| *F01D 1/08* | (2006.01) |
| *F01D 1/02* | (2006.01) |
| *F01D 17/16* | (2006.01) |
| *F01D 25/22* | (2006.01) |
| *F01D 5/06* | (2006.01) |

(52) U.S. Cl.
CPC .............. *F01D 25/162* (2013.01); *F01D 1/02* (2013.01); *F01D 1/04* (2013.01); *F01D 1/08* (2013.01); *F01D 5/06* (2013.01); *F01D 17/162* (2013.01); *F01D 17/165* (2013.01); *F01D 25/22* (2013.01); *F05D 2220/30* (2013.01); *F05D 2240/24* (2013.01); *F05D 2240/50* (2013.01)

(58) Field of Classification Search
CPC . F01D 1/04; F01D 1/02; F01D 17/165; F01D 5/06; F01D 1/08; F01D 5/043; F01D 5/22; F04D 17/025
See application file for complete search history.

(56) References Cited

U.S. PATENT DOCUMENTS

| | | | | |
|---|---|---|---|---|
| 2,821,067 | A * | 1/1958 | Hill ........................... | F23R 3/54 60/805 |
| 4,151,709 | A * | 5/1979 | Melconian ................ | F23R 3/52 60/804 |
| 4,490,622 | A * | 12/1984 | Osborn ................... | F01D 25/16 290/52 |
| 4,619,590 | A * | 10/1986 | Johnson .................... | F02C 6/12 417/407 |

(Continued)

FOREIGN PATENT DOCUMENTS

| | | |
|---|---|---|
| DE | 202015101916 U1 | 5/2015 |
| EP | 3517729 A1 | 7/2019 |
| GB | 2202585 B | 9/1988 |

*Primary Examiner* — Eldon T Brockman
(74) *Attorney, Agent, or Firm* — Baker Hughes Patent Org.

(57) ABSTRACT

The combined radial-axial turboexpander (1) comprises a casing (3) and a shaft (5) arranged in the casing (3) for rotation therein. A radial impeller (25) and an axial expansion wheel (43) are mounted on the shaft (5). The axial expansion wheel (43) is arranged downstream of the radial impeller (25). A working fluid expands sequentially in the radial impeller and in the axial expansion wheel.

10 Claims, 4 Drawing Sheets

(56) References Cited

U.S. PATENT DOCUMENTS

| | | | | |
|---|---|---|---|---|
| 6,422,014 B1* | 7/2002 | Gladden | ............... | F01D 17/105 60/602 |
| 7,571,607 B2* | 8/2009 | Vrbas | .................... | F02B 37/004 60/605.1 |
| 9,500,198 B2* | 11/2016 | Miazgowicz | ......... | F04D 25/024 |
| 2007/0204615 A1* | 9/2007 | Vrbas | .................... | F02B 37/013 60/602 |
| 2014/0234072 A1* | 8/2014 | Miazgowicz | ............. | F01D 5/06 415/1 |

* cited by examiner

RADIAL—AXIAL TURBOEXPANDER

CROSS-REFERENCE TO RELATED APPLICATIONS

This application claims the benefit of Italian Patent Application No. 102018000003550 filed on Mar. 14, 2018, the disclosure of which is herein incorporated by reference in its entirety.

TECHNICAL FIELD

The present disclosure relates to turbomachines. More specifically, embodiments disclosed herein concern turboexpanders, and in particular multi-stage turboexpanders.

BACKGROUND ART

Turbomachines are devices where mechanical energy in the form of a shaft work is transferred either to or from a continuously flowing fluid by the dynamic action of rotating blades. Turboexpanders are turbomachines wherein a pressurized compressible working fluid is expanded while flowing in flow channels defined between blades of a rotor or wheel. The expansion of the working fluid causes enthalpy of the expanding working fluid to be converted into mechanical power, available on the shaft of the turboexpander.

Turboexpanders are often used in several industrial systems and plants, where a flow of pressurized and possibly hot working fluid is available and can be used to extract power therefrom by conversion of enthalpy of the working fluid into mechanical power.

Turboexpanders can be classified in axial turboexpanders, where the flow of working fluid is substantially parallel to the axis of the rotor, and radial turboexpanders, where the flow of working fluid is substantially radial in at least part of the working fluid path through the turboexpander. The fluid usually flows in a centripetal direction, i.e. it enters the impeller at a first radial position and exits the impeller at a second radial position which is nearer than the first radial position to the rotation axis of the impeller.

Some known turboexpanders are provided with an integrated gear transmission. A central toothed wheel meshes with a plurality of pinions. Each pinion is mounted on a respective shaft for co-rotation therewith. The shaft supports one or two overhung impellers. Each impeller is housed in a respective housing and forms therewith one of the turboexpander stages.

Integrally geared turboexpanders are used for instance in so-called CAES (Compressed Air Energy Storage) systems. Examples of integrally geared turboexpanders are disclosed in F. Buffa, Simon Kemble, G. Manfrida, A. Milazzo: "*Energy and Exergoeconomic Model of a Ground-Based CAES Plant for Peak-Load Energy Production*", Energies 2013, 6, 1050-1067, DOI:10.3390/en6021050; ISSN 1996-1073, available from www.mdpi.com/journals/energies.

The gear train formed by the central toothed wheel and peripheral pinions meshing therewith is complex and cumbersome, and increases the footprint of the turboexpander. Gears adversely affect the overall efficiency of the turboexpander, since part of the mechanical power generated by expansion is dissipated by mechanical friction in the gear train.

Gaseous working fluid expands sequentially through impellers mounted on different shafts, such that power generated by each impeller is transferred to the central toothed wheel, which in turn can be drivingly coupled to a load, for instance through a central shaft, on which the central toothed wheel is integrally mounted. Each impeller must be fluidly coupled to a subsequent or preceding impeller through a pipe. A complex piping system is thus required for the gaseous working fluid to flow through the plurality of turboexpander stages. This adds to the complexity of the turboexpander.

A more compact and less complicated turboexpander would thus be welcomed in the technology.

SUMMARY

According to one aspect, disclosed herein is a turboexpander including a casing and a shaft rotatingly arranged in the casing. At least one radial impeller and at least one axial expansion wheel are mounted on the shaft. The axial expansion wheel is arranged downstream of the radial impeller. A compressed gaseous fluid expands sequentially in the radial impeller and in the axial expansion wheel.

Further features and embodiments of the turboexpander are set forth in the appended claims and described here on, reference being made to the attached drawings.

According to another aspect, disclosed herein is a method for operating a turboexpander, including the following steps:

expanding a flow of gaseous working fluid in a radial expansion stage including at least a radial impeller mounted for rotation on a shaft, and producing mechanical power therewith; and further expanding the gaseous working fluid in an axial expansion section including an axial expansion wheel mounted for rotation on said shaft, and producing mechanical power therewith.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The present disclosure suggests multi-stage turboexpanders, which have a combined radial and axial configuration. The turboexpander generally includes a casing and a rotary shaft rotatingly supported in the casing. A first section of the turboexpander comprises at least one radial expansion stage. A second section of the turboexpander comprises at least one axial expansion stage. The radial expansion stage and the axial expansion stage are arranged in sequence, such that a flow of working fluid can expand in the radial expansion stage and subsequently further expand in the axial expansion stage, to produce mechanical power.

The radial expansion stage can include a radial impeller, having an inlet and an outlet. The outlet of the radial impeller is directly or indirectly fluidly coupled to an inlet of the axial expansion stage. This latter can include at least one axial expansion wheel, comprised of a circular row of axial expansion blades mounted on an axial expansion wheel. A circular row of inlet guide vanes can be arranged between the outlet of the radial impeller and the set of annularly arranged axial expansion blades. The axial expansion wheel and the radial impeller can be mounted on the rotary shaft for rotation therewith in the casing. At least one end of the shaft can extend from the casing or can be accessible from outside the casing for connection to a load, which can be driven into rotation by mechanical power generated by the turboexpander.

Figure 1:
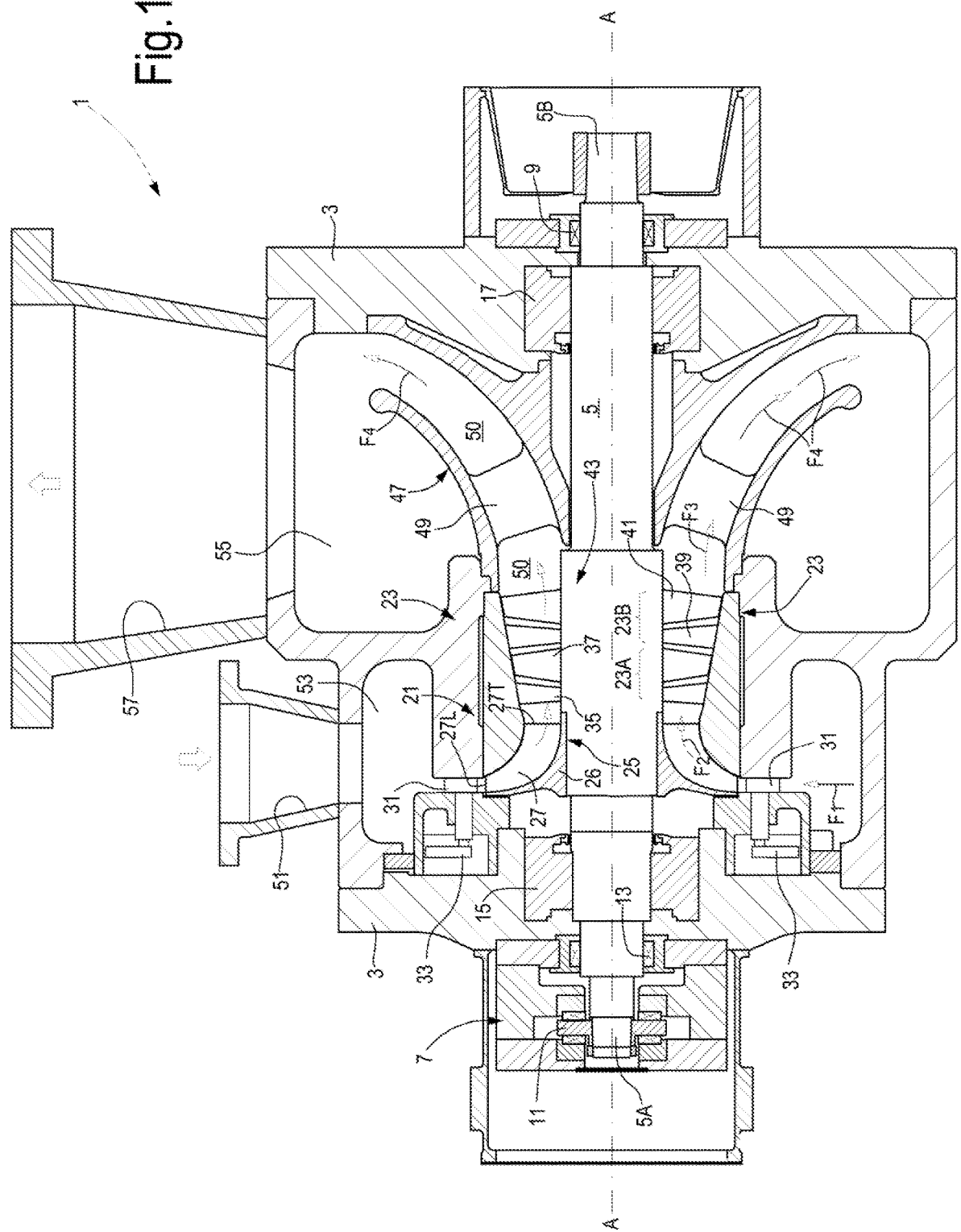
FIG. 1 is a sectional view of an embodiment of a turboexpander according to the present disclosure.

Turning now to the drawing, FIG. 1 illustrates a first embodiment of a combined radial and axial turboexpander according to the present disclosure. The turboexpander 1 comprises a casing 3, which houses a rotary shaft 5. In the embodiment of FIG. 1, the shaft 5 is supported between bearings. More specifically, the shaft comprises a first shaft end 5A and a second shaft end 5B. The first shaft end 5A is rotatingly supported by a first bearing unit 7 and the second shaft end 7B is rotatingly supported by a second bearing unit 9. In some embodiments, at least one of the first and second bearing units 7 and 9 has a radial bearing capacity and an axial bearing capacity. For instance, one of the first and second bearing units 7, 9 can include an axial bearing, also referred to as thrust bearing, and a radial bearing. In the embodiment of FIG. 1 the first bearing unit 7 comprises a thrust bearing 11 and a radial bearing 13. The second bearing unit 9 can include a radial bearing but not a thrust bearing.

The bearings can be rolling bearings or magnetic bearings, in particular active magnetic bearings, for instance. In some embodiments, the bearings can be fluid bearings, such as hydrodynamic fluid bearings, hydrostatic fluid bearings or combined hydrostatic and hydrodynamic fluid bearings. In some embodiments, a combination of different bearings, selected among magnetic, rolling and fluid bearings can be envisaged as well.

In some embodiments one, the other or both shaft ends 5A, 5B can project outside the casing 3, or can be accessible from the exterior of the casing 3, such that for instance a load can be drivingly coupled to one or both the shaft ends 5A, 5B. The load can be drivingly coupled to the shaft 5 directly, in which case the load will rotate at substantially the same rotational speed as the shaft 5. In other embodiments, a speed manipulation device, such as a gear box or a continuous variable speed transmission can be arranged between the shaft 5 and the load. If a first load and a second load are drivingly coupled to the first shaft end 5A and the second shaft end 5B, respectively, one said loads can be coupled to the shaft 5 directly, and the other with the interposition of an intermediate speed manipulation device, according to needs.

A sealing arrangement can be provided at one or both shaft ends 5A, 5B. In the embodiment of FIG. 1, a first sealing arrangement 15 is arranged inboard of the first bearing unit 7 and a second sealing arrangement 17 is arranged inboard of the second bearing unit 9.

The turboexpander 1 comprises a first, radial expansion section 21 and a second, axial expansion section 23. In the embodiment of FIG. 1, the radial expansion section is arranged upstream of the axial expansion section. As used herein, the terms "upstream" and "downstream" are referred to the flow direction of the working fluid trough the turboexpander 1, unless specified otherwise herein. As used herein, the term "axial" is referred to a direction parallel to the rotation axis A-A of shaft 5 and the term "radial" is referred to any direction orthogonal to the axial direction, unless specified otherwise herein.

In the embodiment of FIG. 1, the radial expansion section includes a radial impeller 25 having a hub 26 and a plurality of blades 27 projecting from a front surface of the hub 26. Each blade extends from a respective leading edge 27L to a respective trailing edge 27T. The leading edges 27L are arranged at an impeller inlet and the trailing edges 27T are arranged at an impeller outlet. The impeller inlet is at a distance from a rotation axis A-A of the shaft 5 greater than the distance of the impeller outlet. The working fluid therefore flows at least partly in a radial inward direction through the radial impeller 25. Pairs of consecutive blades 27 define therebetween flow channels, through which the working fluid flows. Each flow channel has a radially developing portion and can have an axially developing outlet portion.

The speed of the working fluid at the inlet of the impeller 25 has a radial speed component F1 and can have a tangential speed component, i.e. a component parallel to the speed of the impeller at the impeller inlet. Similarly, the working fluid at the outlet of the radial impeller 25 has an axial speed component F2 and a tangential speed component.

At the inlet of the radial impeller 25 a row of circularly arranged inlet guide vanes or nozzle guide vanes 31 are arranged, shortly referred to herein also as NGV. The NGVs 31 can be fixed. In other embodiments, the NGVs 31 are variable NGVs, i.e. their angular position can be adjusted as a function of the operating conditions of the turboexpander, so that the speed direction of the working fluid flow entering the flow channels of the radial impeller 25 can be adjusted. NGV actuators 33 can be provided to adjust the angular position of the NGVs 31.

The axial expansion section 23 can include at least one axial expansion stage. In the embodiment of FIG. 1, the axial expansion section 23 comprises two axial expansion stages 23A, 23B. The first axial expansion stage 23A comprises a circular row of stationary guide blades 35 and a circular row of rotating rotor blades 37. The second axial expansion stage 23B comprises a circular row of stationary guide blades 39 and a circular row of rotating rotor blades 41. The rotor blades 37 and 41 form part of an axial rotor or axial expansion wheel 43 and rotate integrally with the shaft 5.

The stationary guide blades 35 are arranged to receive the working fluid flow from the radial impeller 25 and divert the flow towards the rotor blades 37.

Downstream of the axial expansion section 23 a diffuser 47 can be arranged, which imparts at least a radial component to the speed of the expanded working fluid discharged from the axial expansion section 23 and entering the diffuser 47, as pictorially shown by arrows F3 (at the inlet of the diffuser 47) and F4 (at the outlet of the diffuser 47). The diffuser 47 can include struts 49 extending across an annular flow channel 50.

The working fluid is delivered to the turboexpander 1 through an inlet nozzle 51, which is fluidly coupled to an inlet plenum 53, wherefrom the working fluid flows through the inlet guide vanes 31 in the radial impeller 25. The expanded working fluid is collected in an exhaust plenum 55, which is fluidly coupled to a discharge nozzle 57, through which the working fluid is discharged from the turboexpander 1.

The turboexpander 1 operates as follows. A flow of compressed and possibly hot gaseous working fluid, such as hot compressed air from a CAES system, enters the turboexpander 1 through the inlet nozzle 51 and partly expands through the radial expansion stage 21. Part of the working fluid enthalpy is converted into mechanical power available on the shaft 5. The partly expanded working fluid enters the axial expansion section 23 and is further expanded, to generate additional mechanical power available on shaft 5. The exhaust working fluid is then collected in the exhaust plenum 55 and discharged from the turboexpander 1 through discharge nozzle 57.

Figure 2:
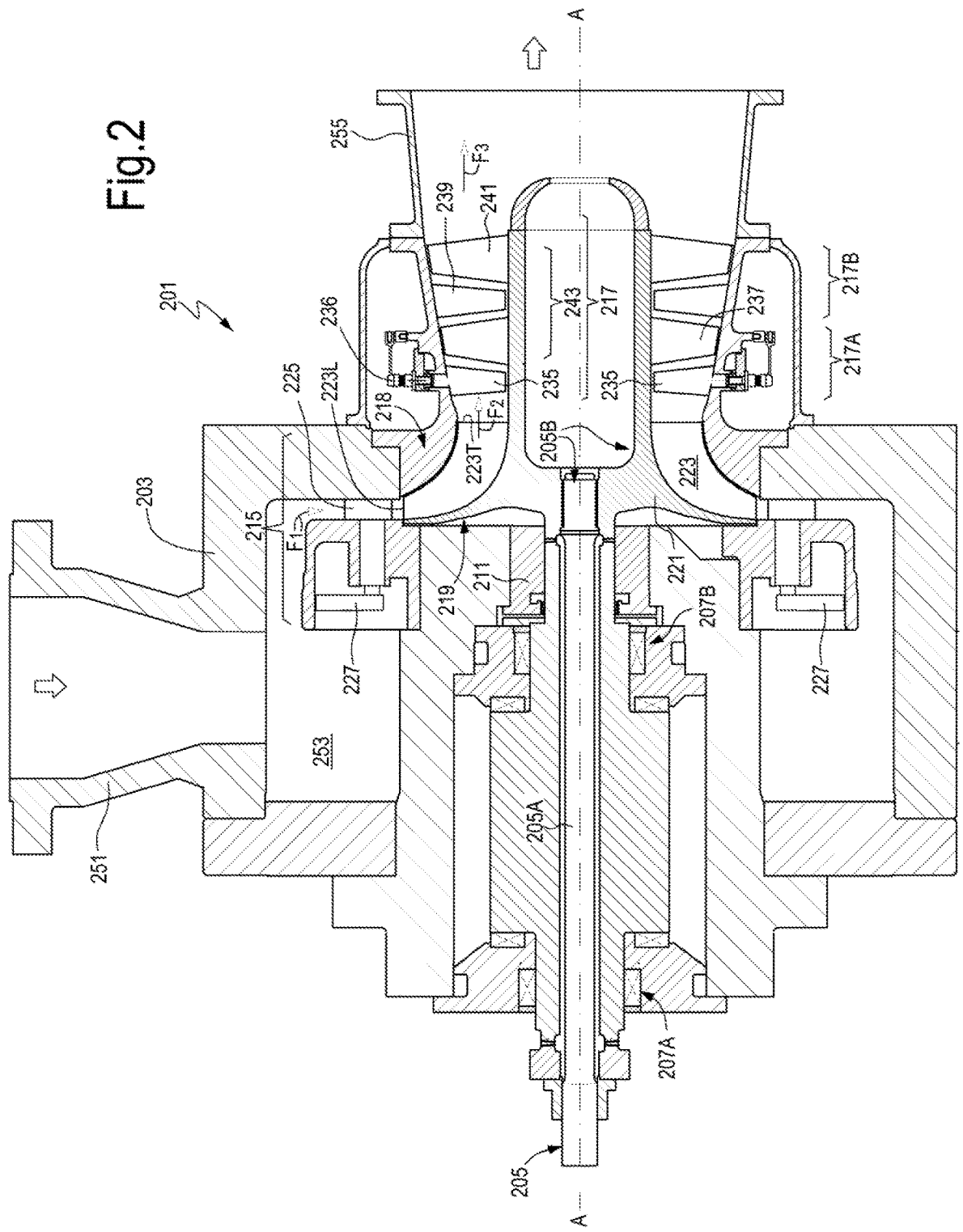
FIG. 2 is a sectional view of a turboexpander according to the present disclosure in a second embodiment.

While in the embodiment of FIG. 1 the radial expansion stage 21 and the axial expansion stage 23 are arranged between the bearings 11, 13 and 9, in other embodiments the expansion stages can be mounted in an overhung configuration. FIG. 2 illustrates a turboexpander 201 having a casing 203, in which a shaft 205 is supported for rotation therein around a rotation axis A-A.

The shaft 205 can include a first shaft portion 205A and a second shaft portion 205B. The first shaft portion 205A is supported in the casing 203 by means of a bearing assembly. The bearing assembly can include a first bearing unit 207A and a second bearing unit 207B. The bearing assembly 207A, 207B can have an axial load capacity and a radial load capacity and can include, similarly to the bearings of FIG. 1, rolling bearing, fluid bearing, magnetic bearing or combinations thereof, for instance.

The shaft portion 205B is mounted in an overhung configuration extending from the bearing assembly 207A, 207B. Suitable sealing arrangements, one of which is schematically shown at 211, can prevent or reduce fluid leakages along the shaft 205. As will be described in detail here on, a radial expansion stage and a radial expansion stage are mounted in an overhung arrangement on the shaft portion 205B.

The turboexpander 201 further includes a radial expansion section 215 and an axial expansion section 217. The radial expansion section 215 includes a radial expansion stage 218 including a radial impeller 219 having a hub 221 and a plurality of blades 223 extending from a front surface of the hub 221. Each pair of consecutive blades 223 forms a flow channel therebetween, through which the working fluid flows and expands. Each blade 223 comprises a leading edge 223L and a trailing edge 223T. The leading edges 223L are arranged at an impeller inlet and the trailing edges 223T are arranged at an impeller outlet, in quite the same way as for the radial impeller 25 of FIG. 1.

Fixed or variable nozzle guide vanes (NGVs) 225 can be arranged in a circular row around the inlet of the radial impeller 219. If variable NGVs 225 are provided. NGV actuators 227 can be provided, for adjust the angular position of all NGVs 225.

The axial expansion section 217 is arranged downstream of the outlet of the radial impeller 219. In some embodiments, the axial expansions section 217 includes at least one axial expansion stage. Preferably, the axial expansion section 217 includes a plurality of axial expansion stages. In the embodiment of FIG. 2 the axial expansion section 217 includes two axial expansions stages 217A, 217B. The first axial expansion stage 217A includes a circular row of stationary guide blades 235 and a circular row of rotating rotor blades 237. The second axial expansion stage 217B comprises a circular row of stationary guide blades 239 and a circular row of rotating rotor blades 241. The rotor blades 237, 241 form part of an axial rotor or axial expansion wheel 243 and rotate integrally with the shaft 205. The stationary guide blades 235 are arranged to receive the working fluid flow from the radial impeller 219 and divert the flow towards the rotor blades 237.

In some embodiments, the stationary blades of at least one axial expansion stages of the axial expansion section 217 can be adjustable, i.e. can have a variable inclination, to adjust their angular position as a function of the operating conditions of the turboexpander 201. In some embodiments, at least the stationary blades of the first axial expansion stage, i.e. stationary blades 235 in FIG. 2, are variable stationary blades. Each stationary blade 235 can be pivotally adjusted around a radial axis. A blade actuator 236 can be provided to adjust the angular position of all adjustable stationary blades 235.

Compressed working fluid is delivered to the turboexpander 201 through an inlet nozzle 251, which is fluidly coupled to an inlet plenum 253. Exhaust working fluid is discharged axially, for instance through a conical diffuser 255 coaxial to the rotation axis A-A of the turboexpander 201.

The turboexpander 201 operates in quite the same way as the turboexpander 1 of FIG. 1. A flow of compressed and possibly hot gaseous working fluid, such as hot compressed air from a CAES system, enters the turboexpander 201 through the inlet nozzle 251 and partly expands through the radial expansion impeller 219 (see arrows F1, F2). Part of the working fluid enthalpy is converted into mechanical power available on the shaft 205. The partly expanded working fluid enters the axial expansion section 217 and is further expanded sequentially in the two axial expansion stages 217A, 217B, to generate additional mechanical power available on shaft 205. The exhaust working fluid is then discharged (arrow F3) from the turboexpander 201 through conical diffuser 255.

Figure 3:
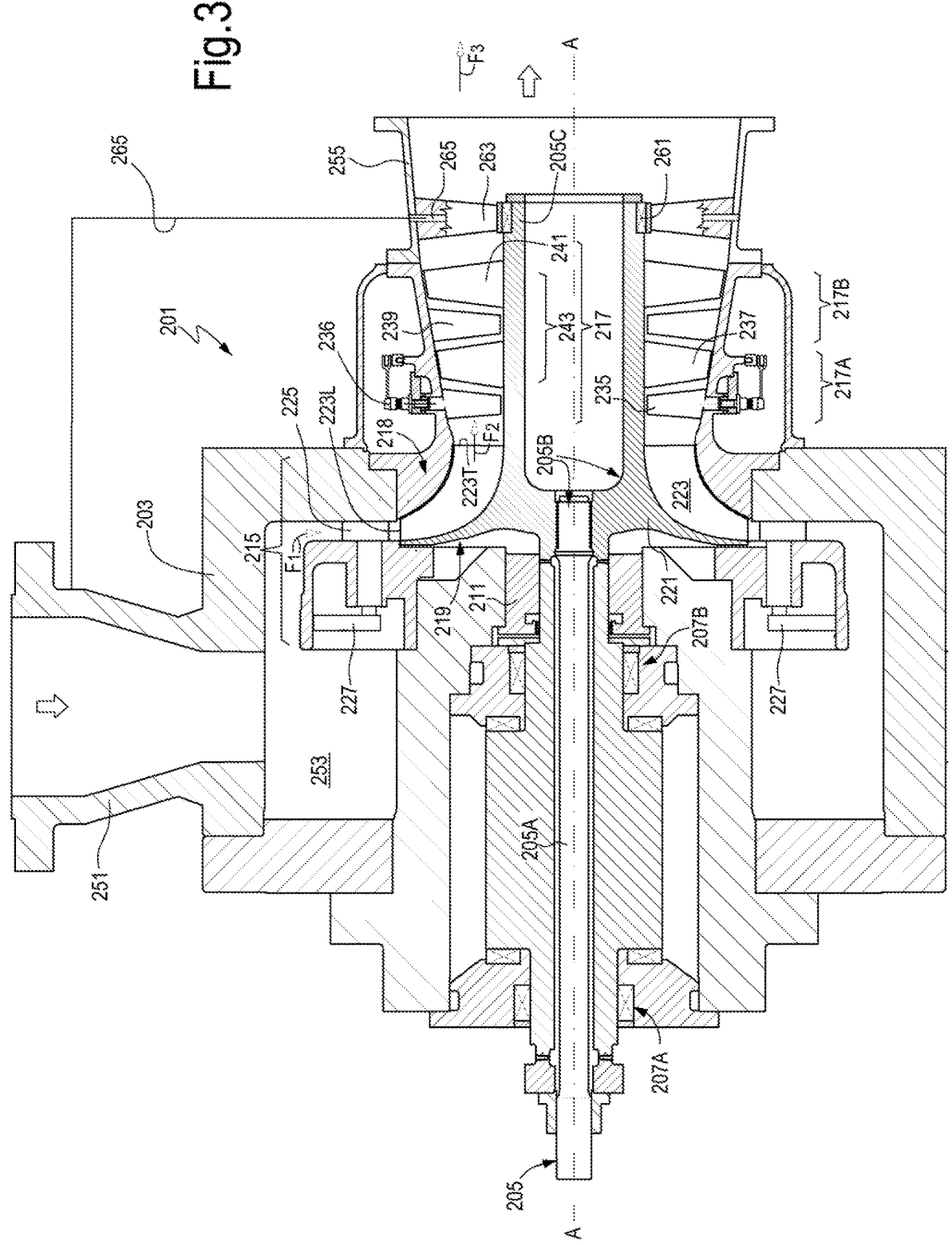
FIG. 3 is a sectional view of a turboexpander according to the present disclosure in a third embodiment.

To provide a better support for the overhung shaft portion 205B, in some embodiments an auxiliary supporting bearing can be provided at or near the distal end of the overhung shaft portion 205B. FIG. 3 illustrates a further embodiment of the turboexpander 201, which differs from the embodiment of FIG. 2 mainly in view of an auxiliary shaft-supporting bearing 261, which is positioned on an extension nose 205C of the shaft 205. The same reference numbers are used to designate the same or corresponding elements, parts and components shown in FIG. 2, which will not be described again.

The auxiliary bearing 261 can be a gas bearing. In some embodiments, the inner rotating portion of the auxiliary hearing 261 can be mounted for rotation on the shaft 205, while the external stationary portion of the auxiliary bearing 261 can be mounted in a stationary seat connected to the casing 203 of the turboexpander 201 by means of struts 263. One or more of struts 263 can house a duct 265, which can be fluidly coupled to the auxiliary bearing 261 and to the inlet nozzle 251 of the turboexpander 201, such that compressed working id can be used as bearing fluid in the auxiliary bearing 261.

Figure 4:
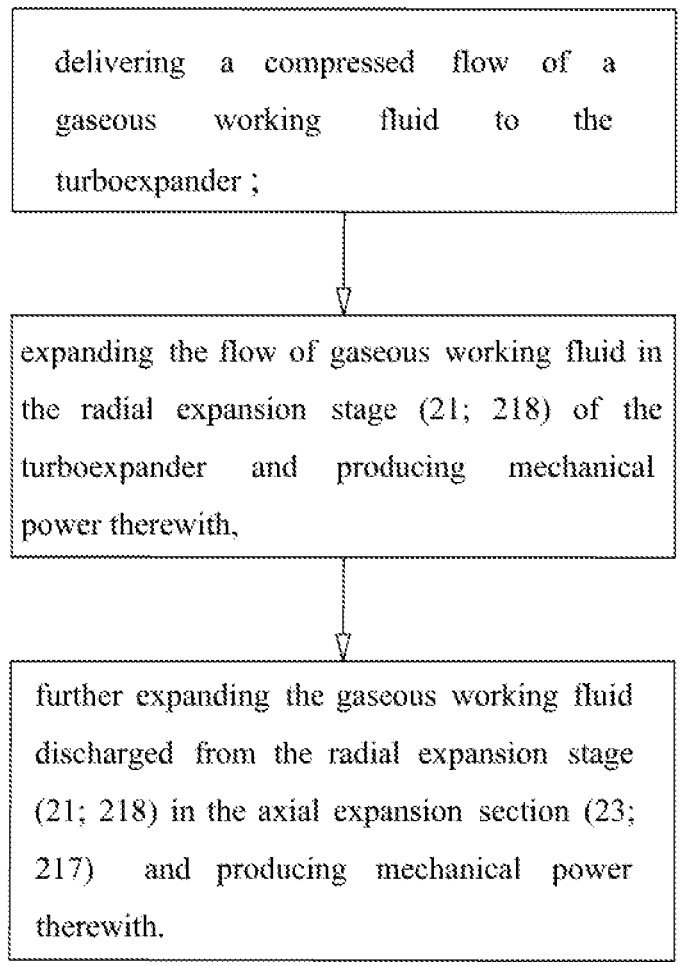
FIG. 4 is a flow-chart summarizing a turboexpander operating method according to the present disclosure.

FIG. 4 illustrates a flow-chart, which summarizes the method of operation of a turboexpander according to the present disclosure.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A turboexpander comprising:
   a casing;
   a shaft arranged in the casing for rotation therein;
   mounted on the shaft, at least one radial impeller of a radial expansion stage;

mounted on the shaft, at least one axial expansion wheel of an axial expansion section, wherein the axial expansion section is arranged downstream of the radial expansion stage;

variable nozzle guide vanes provided at an inlet side of the at least one radial impeller;

a first shaft portion mounted for rotation in a bearing assembly, and a second shaft portion projecting from the bearing assembly and on which the at least one radial impeller and the axial expansion wheel are mounted; and an auxiliary shaft-supporting bearing arranged at one end of the second shaft portion opposite the bearing assembly, wherein the at least one radial impeller and the axial expansion wheel are arranged between the bearing assembly and the auxiliary shaft-supporting bearing.

2. The turboexpander of claim 1, wherein the at least one radial impeller is configured to cause a working fluid to flow in a radial inward direction therethrough.

3. The turboexpander of claim 1, wherein the axial expansion section comprises at least one axial expansion stage.

4. The turboexpander of claim 1, wherein the axial expansion section comprises a plurality of sequentially arranged axial expansion stages.

5. The turboexpander of claim 1, wherein the auxiliary shaft-supporting bearing comprises a gas bearing.

6. The turboexpander of claim 5, wherein the gas bearing is operated by compressed working fluid from a working fluid flow processed through the turboexpander.

7. The turboexpander of claim 6, wherein the gas bearing is fluidly coupled to an inlet nozzle of the turboexpander.

8. The turboexpander of claim 1, further comprising an axial exhaust gas discharge path.

9. The turboexpander of claim 1, further comprising a radial diffuser downstream of the axial expansion section.

10. The turboexpander of claim 1, wherein the axial expansion section has a first row of variable stationary guide blades.

* * * * *